United States Patent
Ruiter et al.

(10) Patent No.: US 10,133,065 B2
(45) Date of Patent: Nov. 20, 2018

(54) HEADS UP DISPLAY FOR A VEHICLE INTERIOR

(71) Applicant: Visteon Global Technologies, Inc., Van Buren Township, MI (US)

(72) Inventors: Andrew K. Ruiter, Grand Haven, MI (US); Lawrence Robert Hamelink, Hamilton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 165 days.

(21) Appl. No.: 14/772,050

(22) PCT Filed: Feb. 28, 2014

(86) PCT No.: PCT/US2014/019610
§ 371 (c)(1),
(2) Date: Sep. 1, 2015

(87) PCT Pub. No.: WO2014/134546
PCT Pub. Date: Sep. 4, 2014

(65) Prior Publication Data
US 2017/0212345 A1    Jul. 27, 2017

Related U.S. Application Data

(60) Provisional application No. 61/771,414, filed on Mar. 1, 2013.

(51) Int. Cl.
| | |
|---|---|
| *G02B 27/01* | (2006.01) |
| *B60K 37/02* | (2006.01) |
| *B60K 35/00* | (2006.01) |

(52) U.S. Cl.
CPC .......... *G02B 27/0101* (2013.01); *B60K 35/00* (2013.01); *B60K 37/02* (2013.01);
(Continued)

(58) Field of Classification Search
CPC ............. G09G 5/12; G09G 5/14; G09G 5/003
See application file for complete search history.

(56) References Cited

U.S. PATENT DOCUMENTS

| | | |
|---|---|---|
| 5,214,413 A | 5/1993 | Okabayashi et al. |
| 5,686,979 A | 11/1997 | Weber et al. |
| (Continued) | | |

FOREIGN PATENT DOCUMENTS

| | | |
|---|---|---|
| DE | 102009031042 | 1/2011 |
| WO | 2014098911 | 6/2014 |

OTHER PUBLICATIONS

Bowen et al., "Temporal Brightness Enhancement Studied with a Large Sample of Observers: Evidence for Individual Differences in Brightness Perception," Perception & Psychophysics, 1980, pp. 465-476, vol. 27 (5).

(Continued)

*Primary Examiner* — Olga Merkoulova
(74) *Attorney, Agent, or Firm* — Fletcher Yoder, P.C.

(57) ABSTRACT

The present invention relates to a heads up display system for a vehicle interior that includes a light modifying panel configured to cyclically transition between a substantially light transmissive state that facilitates light passage through the light modifying panel and a partially reflective state that facilitates light reflection toward a occupant of a vehicle. The heads up display system also includes a pulsating light source configured to cyclically project an image onto the light modifying panel, and a controller configured to control the pulsating light source and the light modifying panel so that the image is projected onto the light modifying panel while the light modifying panel is in the partially reflective state.

17 Claims, 5 Drawing Sheets

(52) U.S. Cl.
CPC ...... *G02B 27/01* (2013.01); *B60K 2350/1072* (2013.01); *B60K 2350/203* (2013.01); *B60K 2350/2021* (2013.01); *B60K 2350/2047* (2013.01); *B60K 2350/352* (2013.01); *G02B 2027/013* (2013.01); *G02B 2027/0118* (2013.01); *G02B 2027/0141* (2013.01); *G02B 2027/0196* (2013.01)

(56) References Cited

U.S. PATENT DOCUMENTS

| | | | | |
|---|---|---|---|---|
| 5,713,353 | A | * | 2/1998 | Castano ............. A61B 5/14532 600/316 |
| 5,729,242 | A | | 3/1998 | Margerum et al. |
| 6,100,943 | A | | 8/2000 | Koide et al. |
| 6,567,014 | B1 | | 5/2003 | Hansen et al. |
| 6,987,787 | B1 | * | 1/2006 | Mick ................. H05B 33/0818 372/29.02 |
| 2006/0196613 | A1 | | 9/2006 | Lamontagne et al. |
| 2009/0167966 | A1 | | 7/2009 | Nam et al. |
| 2010/0066925 | A1 | * | 3/2010 | Nagahara ............... G02B 27/01 349/11 |
| 2012/0212523 | A1 | * | 8/2012 | Yamauchi ............. G03B 21/60 345/697 |
| 2014/0098007 | A1 | * | 4/2014 | Delpier ................ G06F 3/1423 345/2.1 |

OTHER PUBLICATIONS

Hantronix, Inc. "LED Back Light Driving Methods," 2000.
Wang et al., "The Optimized PWM Driving for the Lighting System Based on Physiological Characteristic of Human Vision," , Proc. SPIE 8120 (2011).
Eskow, "Light Matters, Designing Illumination Systems with High-Brightness LEDs", LightSpeed, AVNET Electronics Marketing, http://www.em.avnet.com/en-us/design/marketsolutions/Documents/Lighting/LightSpeed-Eskow-0410.pdf, (2010).
PCT Invitation to Pay Additional Fees dated May 16, 2014.
PCT International Search Report and Written Opinion dated Aug. 18, 2014.
Pulsing LEDs for Effeciency, Brighter Appearance and Multiplexed Display, updated Jan. 25, 2012, http://www.piclist.com/techref/io/led/pulse.htm, visited Sep. 1, 2015.
Kalloniatis et al., Webvision: The Organization of the Retina and Visual System, (created 2005, updated 2007), http://www.piclist.com/techref/io/led/pulse.htm, visited Sep. 1, 2015.
The Light Emitting Diode,Electronics Tutorials, http://www.electronics-tutorials.ws/diode/diode_8.html, visited Sep. 1, 2015.

* cited by examiner

HEADS UP DISPLAY FOR A VEHICLE INTERIOR

CROSS REFERENCE TO RELATED APPLICATIONS

This application is a national stage of PCT Application No. PCT/US2014/19610, entitled "HEADS UP DISPLAY FOR A VEHICLE INTERIOR", filed on Feb. 28, 2014, which claims priority from and the benefit of U.S. Provisional Patent Application Ser. No. 61/771,414, entitled "HEADS UP DISPLAY FOR A VEHICLE INTERIOR", filed Mar. 1, 2013. Each of the foregoing applications is hereby incorporated by reference in its entirety.

BACKGROUND

The invention relates generally to the display of information in the interior of a vehicle, and more specifically to head-up displays that allow the driver of a vehicle to maintain focus on the road in front of the vehicle during operation.

Vehicle displays are used to provide information concerning operation and condition of the vehicle to the driver and/or other occupants of the vehicle. In a current trend, displays are becoming more sophisticated and provide the driver with more information such as location of the vehicle and navigation directions, etc. To avoid distraction of the driver during operation, Heads Up Displays have been created so that the driver does not have to look down away from the path of the vehicle to receive information about the vehicle. In current heads up displays, an image is projected onto a compound curved piece of polycarbonate with a reflective coating on the back surface. The polycarbonate acts like a lens to focus an image so that the driver can view it. Regulatory bodies in some cases require 75 percent transmissibility for lenses placed in the forward view of a vehicle driver. This regulation means that a significant portion of light passes through the lens and is not reflected to the driver. This creates a waste of power, and low-contrast images presented to the driver. The disclosed embodiments provide advantages over these shortcomings.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present invention relates to a heads up display system for a vehicle interior that includes a light modifying panel configured to cyclically transition between a substantially light transmissive state that facilitates light passage through the light modifying panel and a partially reflective state that facilitates light reflection toward an occupant of a vehicle. The heads up display system also includes a pulsating light source configured to cyclically project an image onto the light modifying panel, and a controller configured to control the pulsating light source and the light modifying panel so that the image is projected onto the light modifying panel while the light modifying panel is in the partially reflective state.

The present invention also relates to a heads up display system for a vehicle interior that includes a light modifying panel configured to cyclically transition between a substantially light transmissive state that facilitates light passage through the light modifying panel and a partially reflective state that facilitates light reflection toward a occupant of a vehicle, a light source configured to shine an image at the light modifying panel, and a controller configured to control the state of the light modifying panel.

The present invention additionally relates to a heads up display system for a vehicle interior that includes a pulsating light source configured to cyclically project an image onto a partially reflective surface, and a controller configured to control the pulsating light source.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
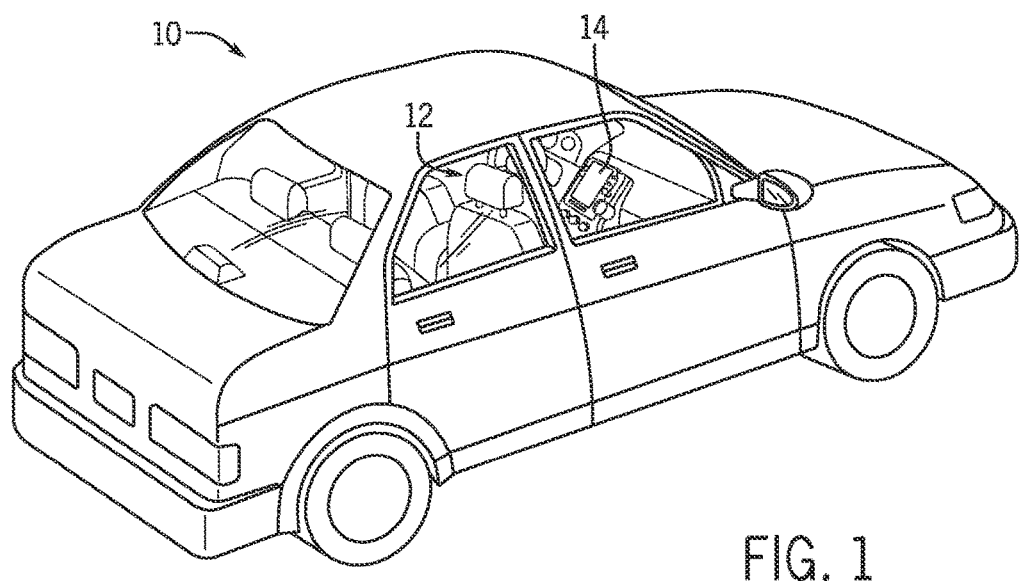
FIG. 1 is a perspective view of an exemplary vehicle that may include a heads up display system configured to present an image to the driver of the vehicle

FIG. 1 is a perspective view of an exemplary vehicle 10 that may include a heads up display system configured to present an image to a driver. As illustrated, the vehicle 10 includes an interior 12 having an instrument panel 14. As discussed in detail below, graphical displays within the instrument panel 14 and/or the center console present graphical information to a driver regarding a variety of parameters associated with vehicle operation. A light modifying panel uses pulse width modulation (PWM) to increase the perceived brightness of the display without a corresponding increase in power usage. By flickering the display at a frequency undetectable to the human eye, a controller will cause the image displayed to appear stable to the driver of the vehicle 10. The light modifying panel may also include functionality to display a virtual image to the driver while maintaining transparency and thus visibility of the road.

Figure 2:
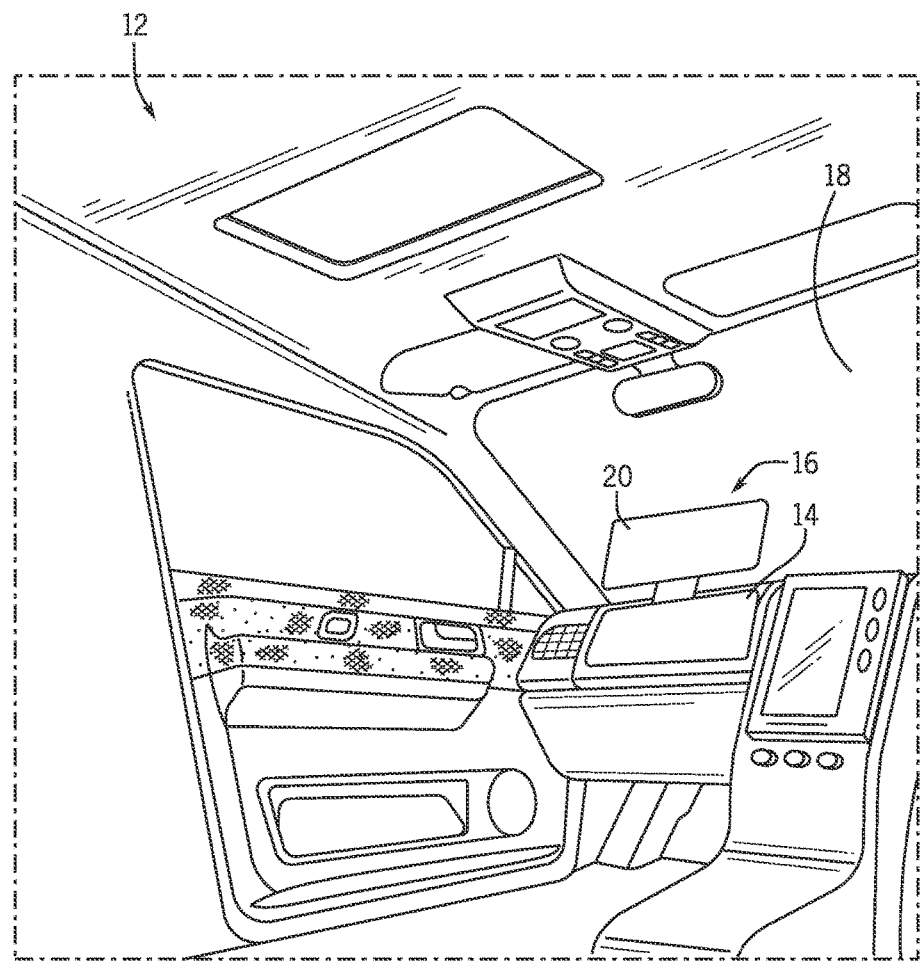
FIG. 2 is a perspective view of a part of the interior of the vehicle of FIG. 1.

FIG. 2 is a perspective view of a part of the interior 12 of the vehicle 10 of FIG. 1. As illustrated, the instrument panel 14 includes a heads up display (HUD) 16. As discussed in detail below, the HUD 16 is configured to present graphical information to the driver. The HUD 16 includes a partially reflective panel that may be disposed directly onto or within the windshield 18, or the light reflective panel may be part of a separate combiner 20, as shown in FIG. 2. The combiner 20 may be curved to form a virtual image that appears to be forward of the windshield 18. In certain embodiments, the partially reflective panel is formed from a light modifying panel configured to transition between a substantially light transmissive state and a partially reflective state. As described below, the rapid switching between the two states enables a driver 24 to have a clear view of the road in front of the vehicle 10 while viewing an image projected onto the light modifying panel. It is possible to utilize any suitable method of switching between the states. As described in detail below, the HUD 16 may also include a pulsating light source that switches between a light emitting state and a non-emissive state. Pulsing the light source may increase the perceived brightness due to psycho-physical characteristics inherent in the eyes of most human beings.

Figure 3:
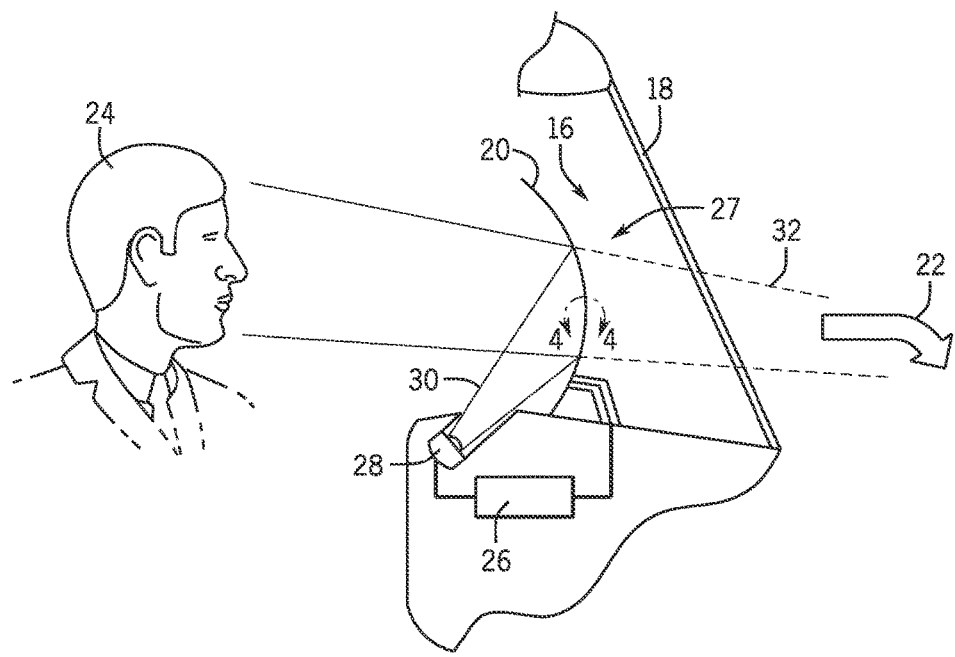
FIG. 3 is a schematic diagram of an embodiment of a heads up display system that may be employed within the vehicle of FIG. 1.

FIG. 3 is a schematic diagram of an embodiment of a heads up display system that may be employed within the vehicle of FIG. 1. In the illustrated embodiment, the combiner 20 is curved to enable the HUD 16 to display a virtual image 22 that appears to the driver 24 as being outside of the vehicle 10. Light 30 is emitted onto the combiner 20, and the combiner 20 is shaped so that the image 22 appears to have traveled to the eye of the driver 24 along virtual lines 32. The virtual image 22 may include directional information, such as information from a navigation system, or may include operational information about the vehicle, such as speed and direction heading. Because the virtual image 22 appears to be outside the windshield 18, the driver 24 may view the virtual image 22 while maintaining focus on the road in front of the vehicle 10. While the illustrated embodiment shows a curved combiner 20, this is not required by the current invention. The combiner 20 may be flat which may enable the combiner 20 to be incorporated into the windshield 18. Incorporation with the windshield 18 would enable manufacture of the combiner 20 with less components, potentially decreasing costs and manufacturing time.

As illustrated, the HUD 16 includes a controller 26 configured to control operation of a light modifying panel 27 and a light source 28. The light source 28 emits light 30 onto the light modifying panel 27 of the combiner 20 to produce the virtual image 22. The light source 28 may include any display technology including liquid crystal display (LCD), thin film transistor (TFT) display, digital light processing (DLP) display, a laser display, or any combination thereof. To conserve power and/or to increase luminosity, the light source 28 may rapidly alternate between activated and deactivated states. The alternation between states of the light source 28 may coincide with the partially reflective/substantially light transmissive states of the light modifying panel 27. In some embodiments, the combiner 20 may include a light modifying panel 27 that does not transition between partially reflective and substantially light transmissive states. In these embodiments, the light modifying panel 27 stays in a partially light transmissive state and the alternation of the light source 28 is all the is controlled by the controller 26. Referring back to the illustrated embodiment, the controller 26 controls the light source 28 so that it emits light 30 onto the light modifying panel 27 when the light modifying panel 27 is in the partially reflective state, and the light source is deactivated while the light modifying panel is in the substantially light transmissive state. This configuration reduces power usage by the light source 28.

Figure 4:
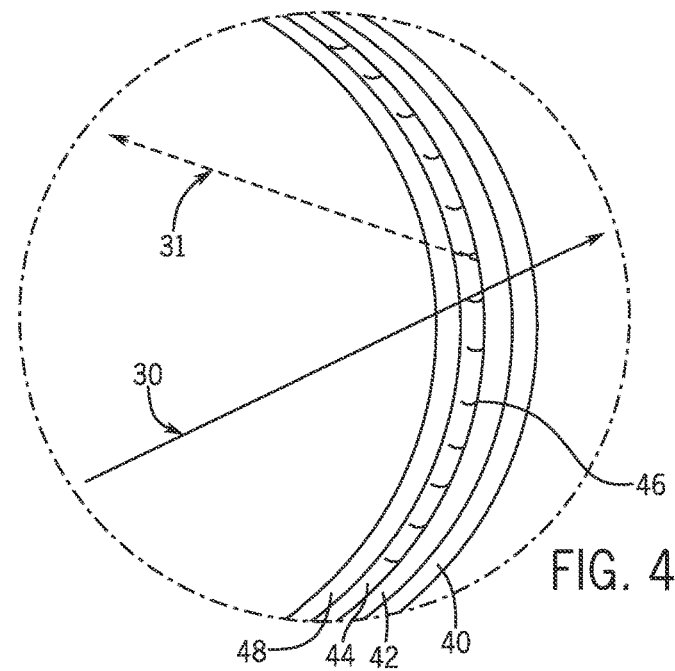
FIG. 4 is a detailed view of a portion of an embodiment of a light modifying panel that may be used within the heads up display system of FIG. 3.

FIG. 4 is a detailed view of a portion of an embodiment of a light modifying panel that may be used within the heads up display system of FIG. 3. The combiner 20 may be flat, convex, or concave depending on considerations such as cost, material strength, and the desire for virtual representation of the image. In one embodiment, the combiner 20/light modifying panel 27 may include four layers as shown. In other embodiments, the four layers shown may be employed on a portion of the combiner 20. Substrate layer 40 may be a transparent substrate material such as glass, Plexiglas, or plastic. The substrate layer 40 provides structural strength and shape for the combiner 20, as well as enhancing safety. A conducting layer 42 is coupled to the substrate 40 and made of a transparent conductive material, such as indium tin oxide, that may conduct a signal to a reflecting layer 44. The reflecting layer 44 may be constructed out of any suitable material that transitions between a substantially light transmissive state and a partially reflective state based on application of electrical power, such as polymer-dispersed liquid crystals (PDLC), or micro-blinds. In the embodiment shown in FIG. 4, the reflecting layer 44 includes micro-blinds 46.

Micro-blinds 46 are composed of microscopic rolled thin metal blinds deposited on the substrate layer 40 or the conductive layer 42. The micro-blinds 46 may include a thin insulating layer 48 to enhance the functionality of the micro-blinds. The insulating layer 48 facilitates establishment of an electric field that pulls the curled blinds 46 flat against the surface of the insulating layer 48. While the blinds 46 are in a relaxed/rolled state (i.e., no voltage is applied) they appear substantially transparent and the light modifying panel is substantially light transmissive. When a voltage is applied, the electric field causes the rolled micro-blinds 46 to stretch out and thus the light 30 is partially reflected. The reflected light 31 is directed toward the driver to enable the driver to see the projected image. It is also possible, in some embodiments, for the voltage to be applied in only a portion of the combiner 20/light modifying panel 27. In such embodiments, the light modifying panel 27 would be substantially light transmissive except for the areas of the light modifying panel 27 to which the voltage was applied. In this way, it would be possible to present an image on a portion of the light modifying panel 27 if, for example, the driver 24 had such a preference.

Figure 5:
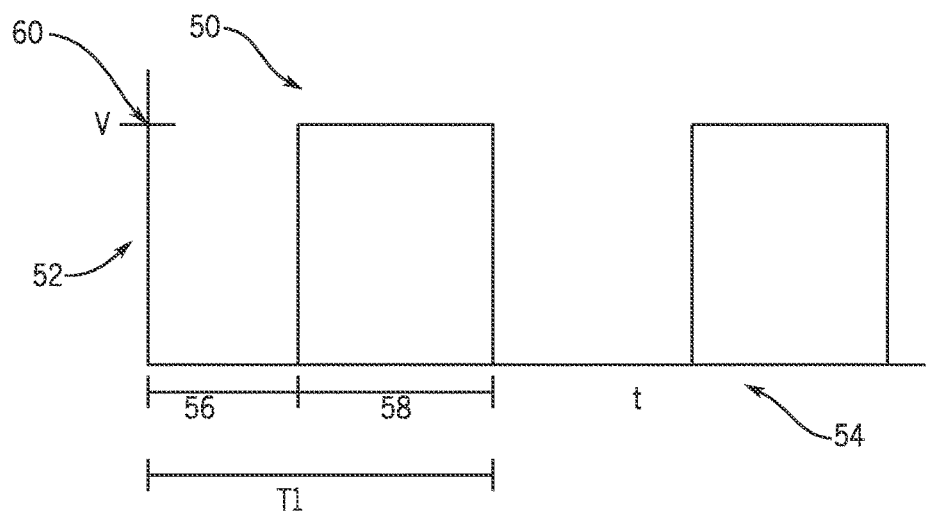
FIG. 5 is a line graph of an embodiment of a voltage curve that may be applied to the light modifying panel of FIG. 4.

FIG. 5 is a line graph of an embodiment of a voltage curve that may be applied to the light modifying panel of FIG. 4. Graph 50 shows the relative voltage 52 as a function of time 54. One cycle T1, contains a first time period 56 and a second time period 58. During the first time period 56, the controller 26 sends little or no voltage to the light modifying panel 27. For the duration of time 56, the light modifying panel 27 is partially reflective. Next, at time period 58, the controller 26 supplies a voltage 60 to the light modifying panel 27. During time 58, the light modifying panel 27 is substantially transparent. The voltage oscillates between reflective time 56 and transparent time 58 several times per second. For example, one cycle T1 may occur between 15 and 100 times per second. In certain embodiments, the time period 56 is shorter than the time period 58. The ratio of voltage applied/zero voltage applied within one cycle is known as the duty cycle. In a typical embodiment the duty cycle may be between about 10 and about 30 percent. Such a duty cycle may enable the driver to see the road and the image on the combiner 20.

Figure 6:
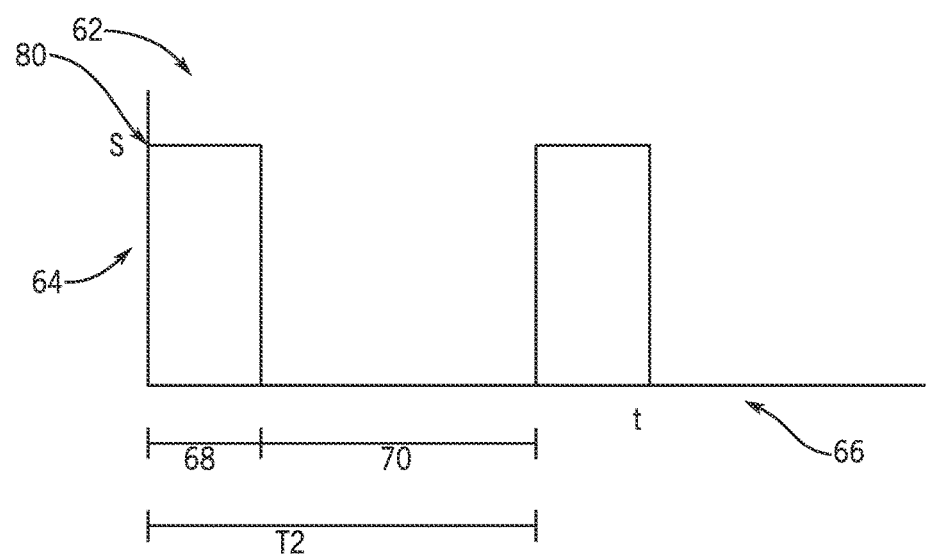
FIG. 6 is a graph voltage curve that may be applied to a light source configured to emit light onto the panel of FIG. 3.

FIG. 6 is a graph voltage curve that may be applied to a light source configured to emit light onto the panel of FIG. 3. While the light source 28 may emit light continuously toward the light modifying panel 27, in certain embodiments the light source 28 emits light according to the pattern illustrated in FIG. 6. Graph 62 shows a magnitude of a signal 64 to the light source 28 as a function of time 66. One cycle T2, contains a first time period 68 and a second time period 70. During the first time period 68, the signal has zero magnitude. For the duration of time period 68, the light source is not emitting light 30. Next, at time period 70, the magnitude of the signal increases to a desired value 80. During time period 70, the light source 28 emits light 30 onto the combiner 20. The controller 26 oscillates between a time period 68, in which no light 30 is emitted, and a time 70, in which light 30 is emitted, several times per second. For example, one cycle T2 may occur 15 to 100 times per second. As with the control of the light modifying panel 27, the controller 26 controls the duty cycle of the light source 28. For example, the duty cycle may be between about 10 and about 30 percent.

Controlling the average magnitude of the signal via a series of pulses is called pulse width modulation (PWM). A light source 28 utilizing PWM will pulse brightly for a short amount of time. The human eye has a certain amount of persistence. If exposed to a bright light, the eye will "remember" the light for a short period of time. Taking advantage of this characteristic of the human eye, PWM can be used to increase perceived brightness of a display, or may be used to decrease current and power usage while maintaining a normal brightness level. The average power in some embodiments may be cut by at least 50 percent. In one embodiment of the current invention, the light source 28 emits light 30 for one-fifth of the time at five times the strength. In other embodiments, the light source 28 emits light 30 for one-fourth of the time at four times the strength, or one-third of the time at three times the strength.

Figure 7:
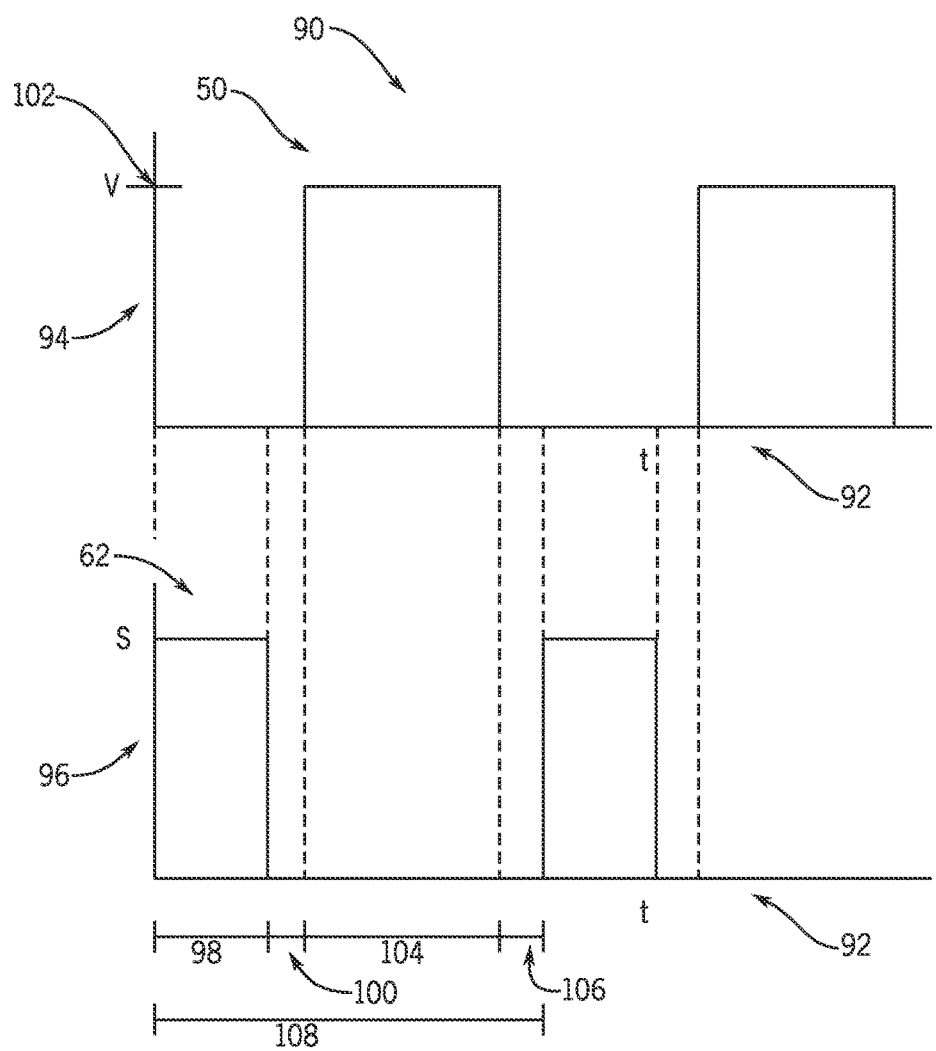
FIG. 7 is a graph voltage curve that may be applied to both the light modifying panel of FIG. 4 and the light source of FIG. 3.

FIG. 7 is a graph voltage curve that may be applied to both the light modifying panel of FIG. 4 and the light source of FIG. 3. Graph 90 shows the combination of graph 50 and graph 62 over the same time period 92. During the first time period 98, the magnitude of the voltage 94 across the combiner 20 is zero while the magnitude 96 of the light source 28 is maximum. Next, at time period 100, the magnitude of the voltage 94 remains zero and the signal 96 to the light source 28 drops to zero. At time period 104, the voltage 94 turns on to maximum value 102, creating the substantially transparent combiner 20, and the signal 96 remains at zero. Finally, at time period 106, the voltage 94 turns off again while the signal 96 remains off. These four time periods (i.e., 98, 100, 104, 106) make up one cycle 108 that is repeated by the controller 28 throughout the duration of operation. Time periods 100 and 106 reduce or eliminate extraneous light 30 that may not reach the driver 24. These time periods (100 and 106) ensure that the light modifying panel 27 is reflective for the entire duration of the time 98, in which the light 30 is being emitted.

The controller 26 may control the frequency as well as the duty cycle for each of the light modifying panel 27 and the light source 28. In certain embodiments, the frequency may be faster than about 24 Hz in order to provide the driver 24 with a steady image. The controller 26 may also be configured to include an alert mode which includes driving the light modifying panel 27 and the light source 28 at a frequency of about 17 Hz. This frequency has been tested as the frequency that is most likely to be perceived by the human eye. Thus, at this frequency, the brightness and the flickering would be the most noticeable, thereby drawing the driver's attention to the image. The alert mode, for example, could be used upon detection of driver distraction. The controller 26 may be configured to detect lane departure, an approaching object, driver eye closure, driver eye position, cell phone activation, erratic speed, and/or interior noise level. Once driver distraction is detected, the controller 26 may remove elements of the graphical content and/or increase the font size of the textual content. As a result, information may be conveyed to the driver in a more concise/simplistic manner, thereby reducing driver focus on the displays and/or directing driver attention toward the vehicle surroundings. When the driver distraction is no longer detected, the controller may restore the content of the displays to the original level.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heads up display system for a vehicle interior comprising:
   a light modifying panel configured to cyclically transition between a substantially light transmissive state that facilitates light passage through the light modifying panel and a partially reflective state that facilitates light reflection toward an occupant of a vehicle;
   a pulsating light source configured to cyclically project an image onto the light modifying panel; and
   a controller configured to control the pulsating light source and the light modifying panel;

wherein the controller, while the heads up display system is in use, is configured to transition the light modifying panel between the substantially light transmissive state and the partially reflective state at a target frequency, to instruct the pulsating light source to cyclically project the image at the target frequency, and to synchronize the cyclic projection of the pulsating light source with the cyclic transition of the light modifying panel such that the pulsating light source projects the image onto the light modifying panel only while the light modifying panel is in the partially reflective state.

2. The heads up display system of claim 1, wherein the light modifying panel is incorporated into a windshield of the vehicle.

3. The heads up display system of claim 1, wherein the light modifying panel is incorporated into a combiner within the vehicle interior, and the combiner is positioned between a windshield and a vehicle seat.

4. The heads up display system of claim 3, wherein the combiner is curved.

5. The heads up display system of claim 3, wherein the combiner is configured to produce a virtual image of the image projected onto the light modifying panel.

6. The heads up display system of claim 1, wherein the image comprises a numerical or graphical representation of a speed of the vehicle.

7. The heads up display system of claim 1, wherein the target frequency is between about 60 Hz and about 100 Hz.

8. The heads up display system of claim 1, wherein the light modifying panel comprises a suspended particle device, an electrochromic device, a polymer dispersed liquid crystal device, or a combination thereof.

9. The heads up display system of claim 1, wherein the light modifying panel comprises micro blinds.

10. A heads up display system for a vehicle interior comprising:
a light modifying panel configured to cyclically transition between a substantially light transmissive state that facilitates light passage through the light modifying panel and a partially reflective state that facilitates light reflection toward an occupant of a vehicle;
a light source configured to shine an image at the light modifying panel; and
a controller configured to control the state of the light modifying panel;
wherein the controller is configured to output a signal to the light modifying panel to transition the light modifying panel between the substantially light transmissive state and the partially reflective state at a target frequency, and the controller is configured to control a reflectivity of the light modifying panel by adjusting a duty cycle of the signal.

11. The heads up display system of claim 10, wherein the target frequency is between about 60 Hz and about 100 Hz.

12. The heads up display system of claim 10, wherein the duty cycle is between about 10 percent and about 30 percent.

13. The heads up display system of claim 10, wherein the light modifying panel comprises micro blinds.

14. A heads up display system for a vehicle interior comprising:
a pulsating light source configured to cyclically project an image onto a partially reflective surface; and
a controller configured to control the pulsating light source, wherein the controller is configured to drive the pulsating light source at a first frequency during normal operation and to drive the pulsating light source at a second frequency in response to engaging an alert mode, the first frequency is greater than about 24 Hz, and the second frequency is about 17 Hz.

15. The heads up display system of claim 14, wherein the first frequency is about 60 Hz to about 100 Hz.

16. The heads up display system of claim 14, further comprising an instrument panel, wherein the pulsating light source is concealed within the instrument panel.

17. The heads up display system of claim 14, wherein the pulsating light source comprises a liquid crystal display (LCD), a thin film transistor (TFT) display, a digital light processing (DLP) display, a laser display, or any combination thereof.

* * * * *